July 23, 1935.  O. E. MILLER  2,008,989
APPARATUS FOR DUPLICATING GOFFERED FILM
Filed Nov. 16, 1932
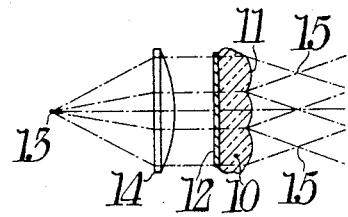
Fig.1.
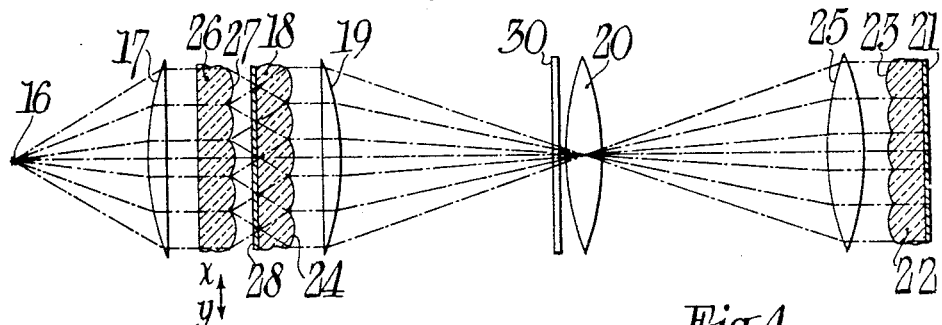
Fig.2.
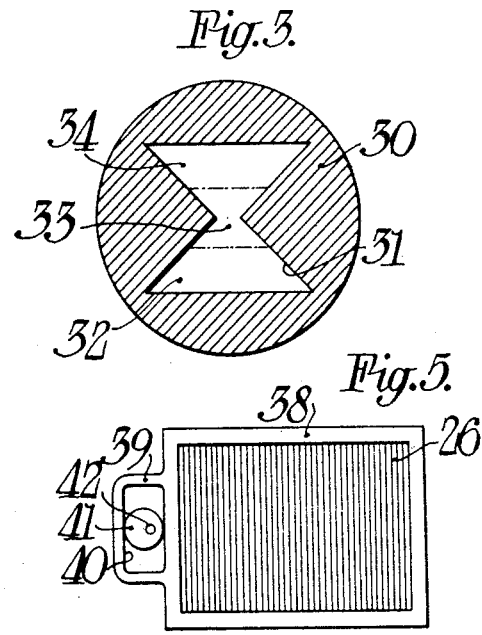
Fig.3.
Fig.5.
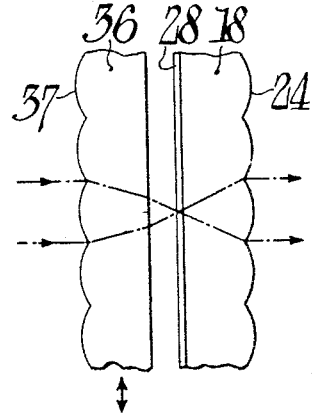
Fig.4.
Inventor:
Oran E. Miller,
By
Attorneys.

Patented July 23, 1935

2,008,989

UNITED STATES PATENT OFFICE 2,008,989

APPARATUS FOR DUPLICATING GOFFERED FILM

Oran E. Miller, Rochester, N. Y., assignor to Eastman Kodak Company, Rochester, N. Y., a corporation of New York Application November 16, 1932, Serial No. 642,909

1 Claim. (Cl. 88—24)

This invention relates to color photography and more particularly to an apparatus for making prints or duplicates by projection on lenticular stock from negative or positive lenticular color film.

When a color separation picture on film having cylindrical embossed lenses is projected using a point or linear source of light the source is imaged as a narrow line behind each embossed layer. The embossing under these conditions behaves as a grating with openings equal to the width of these line images and a grating space equal to the width of an embossed lens element. In printing duplicates by projection this grating effect gives rise to the appearance of a moiré pattern between the original and the copy film and is one of the chief difficulties encountered in printing embossed film.

In accordance with this invention an arrangement for printing embossed film is provided in which the illumination of the original film is so controlled as to prevent the formation of line images behind the original embossed film.

Further in accordance with the improved apparatus of this invention a plurality of images of the light source are formed on the picture layer of the original embossed film and these images are shifted during the printing of each frame a distance equal to the width of a single embossed element on the original film.

Further in accordance with this invention a transparent embossed film or plate is positioned between the light source and the original film with its embossed lenses parallel to those of the original. The lenses formed on the transparent film or plate have a relative aperture not greater than that of the lenses on the embossed film to be printed but may differ in pitch.

The novel features which I believe to be characteristic of my invention are set forth with particularity in the appended claim. The invention itself however both as to its organization and mode of operation will best be understood by reference to the following description taken in connection with the accompanying drawing in which Figure 1 diagrammatically shows how line images are formed by lenticulated film when a point or line source of light is used. Figure 2 is a schematic showing of the optical action of a plain embossed member interposed in the optical path in accordance with this invention. Figure 3 shows a compensating diaphragm which may be used for properly proportioning the exposures according to separate color areas. Figure 4 shows a modified arrangement in which the embossed side of the clear embossed member faces the incident light, and Fig. 5 shows a suitable arrangement for imparting a reciprocating movement to the clear embossed member.

In Figure 1 is shown an ordinary lighting arrangement for illuminating a developed film 10 provided with cylindrical lens elements 11 and an image layer 12 comprising a point or linear source of light 13 and a collimating lens 14 for directing substantially parallel light through the film 10. Each lens element 11 images the light source 13 in a narrow line 15 which gives rise to the grating effect pointed out above.

One embodiment of my invention is diagrammatically shown in Fig. 2 as comprising a source of light 16, a collimating lens 17 for rendering the light substantially parallel, an original film 18 and a collimating lens 19 behind the film 18 and the usual symmetrical objective 20 for forming an image on a sensitized layer 21 carried by an embossed film 22, the lenticulations 23 of which are parallel to the lenticulations 24 on the original film 18 and face the incident light. As is well understood a collimating lens 25 may be positioned immediately in front of the film 22.

The arrangement just described would produce moiré patterns in the printed film due to the grating effect as above pointed out and in order to eliminate this effect I place a clear film or plate 26 having embossed lenses 27 thereon between the light source 16 and the original film 18. The minute lenses 27 have a relative aperture not greater than that of the lenses 24 on the original film 18. The separation of the film 18 and the plate 26 is such that parallel light is brought to focus on the image layer 28 of the film 18 to form a plurality of line images of the light source 16 on this layer. Since these line images lie in the focal plane of the embossed lenses 24 the light is again rendered parallel upon emerging from the original film 18 and according to its direction will pass through the portion of the printing objective 22 corresponding to the filter area represented by the illuminated areas of the image layer 28.

With the plate or film 26 stationary only the portions of the image layer 28 which are illuminated by the line images of the source 16 will be printed and therefore it is necessary to move the member 26 either by oscillation or by continued movement from a loop or roll in a direction perpendicular to the embossings 27 and at a speed sufficient to cover a distance equal to the width of an embossed lens during the exposure of a single frame. A greater speed is optional and may be as fast as other considerations may make it expedient or necessary. The necessary movement of the embossed member 26 is indicated by the arrows x—y. As the member 26 is moved in either direction the line images of the light source 16 travel along the image layer 28 and each part of this layer is successively projected onto the corresponding part of the sensitized layer 21 of the film 22. However due to the fact that the amount of light passed by the objective is more for the center color, usually the green, than for the outer colors, the red and blue which are at the edges of the fields of the embossed lenses on the film 18 it is necessary to compensate for this so that the exposure corresponding to the separate colors will be in the proper proportion. This compensation may be obtained by introducing in the filter plane of the objective a diaphragm which will pass twice as much light at its edges as at its center because at the edge of the field one half the light cone is lost to the adjacent embossed lens and never reaches the objective while in the center of the field the entire cone of light is used. A suitable compensating diaphragm is shown in Figure 3 as having a masking portion 30 provided with an hour-glass shaped cutout portion 31. The filter areas 32, 33 and 34 are parallel to the axes of the cylindrical lenses 23 and 24 embossed on the raw film 27 and the original film 18 and are so proportioned that the area of each of the filter areas 32 and 34 is substantially double that of the center filter area 33.

Another arrangement is shown in Fig. 4 in which the clear plate 36 is positioned within the embossed lenses 37 facing the incident light. Here again the lenses 37 form line images of the light source on the image layer 28 of the original film 18 and movement of the plate 36 in the direction indicated by the double headed arrow during the printing of each frame is necessary as above pointed out to illuminate equally the whole of the image layer 28. It is generally not desirable to have the rear surface of the plate 36 in contact with the image layer 28 and to avoid this the lens elements 37 of the plate 36 are preferably given a longer focal length so that their focal plane is outside the plate 36. The separation of the original film 18 and the plate 36 is made such that the focal plane of the lenses 37 coincide with the image layer 28.

It is to be noted that in both the arrangement just described and the arrangement shown in Fig. 2, the lens elements of the original film and the clear embossed plate are separated by a distance equal to the sum of their focal lengths and that incident parallel light will emerge parallel from the original film.

The printing objective 20 is here shown diagrammatically as a single lens but it is to be understood that in practice it will be one of the several suitable types well known to those skilled in the art.

Any means suitable for imparting the necessary movement to the clear embossed plate or film 26 may be provided and one convenient arrangement is shown in Fig. 5 as comprising a supporting frame 38 for the plate 26 and having formed therewith a slotted projection 39 in the slot 40 of which is positioned an eccentric cam 41 carried by a shaft 42. Rotation of the shaft 42 and its eccentric cam 41 will impart to the plate 26 a movement transverse to its cylindrical lenticulation and the eccentricity of the cam 41 is sufficient to make this movement at least equal to the width of a single embossed element.

Although I have illustrated and described my invention as applied to the printing of goffered film carrying a plurality of color separation images it is obviously not restricted thereto since the apparatus is equally useful for duplicating on the copy film whatever appears in the image layer of the original film and, specifically, may be used to duplicate goffered film bearing separated images corresponding to stereoscopic views.

While I have described in detail one embodiment of my invention to comply with the patent statutes it is to be understood that the invention is not thereby limited, for various modifications will readily suggest themselves to those skilled in the art without departing from my invention as defined in the appended claim.

What I claim as new and desire to secure by Letters Patent of the United States is:—

A projection apparatus for duplicating goffered film having cylindrical lenticulations comprising a source of light, a plurality of cylindrical lenses for forming on the image side of the original film a plurality of line images of said source, means for displacing said lenses in a direction perpendicular to their axes, an objective for projecting the image of the original film upon the copying film, and an hour-glass shaped diaphragm positioned in said objective.

ORAN E. MILLER.